Figure 1:
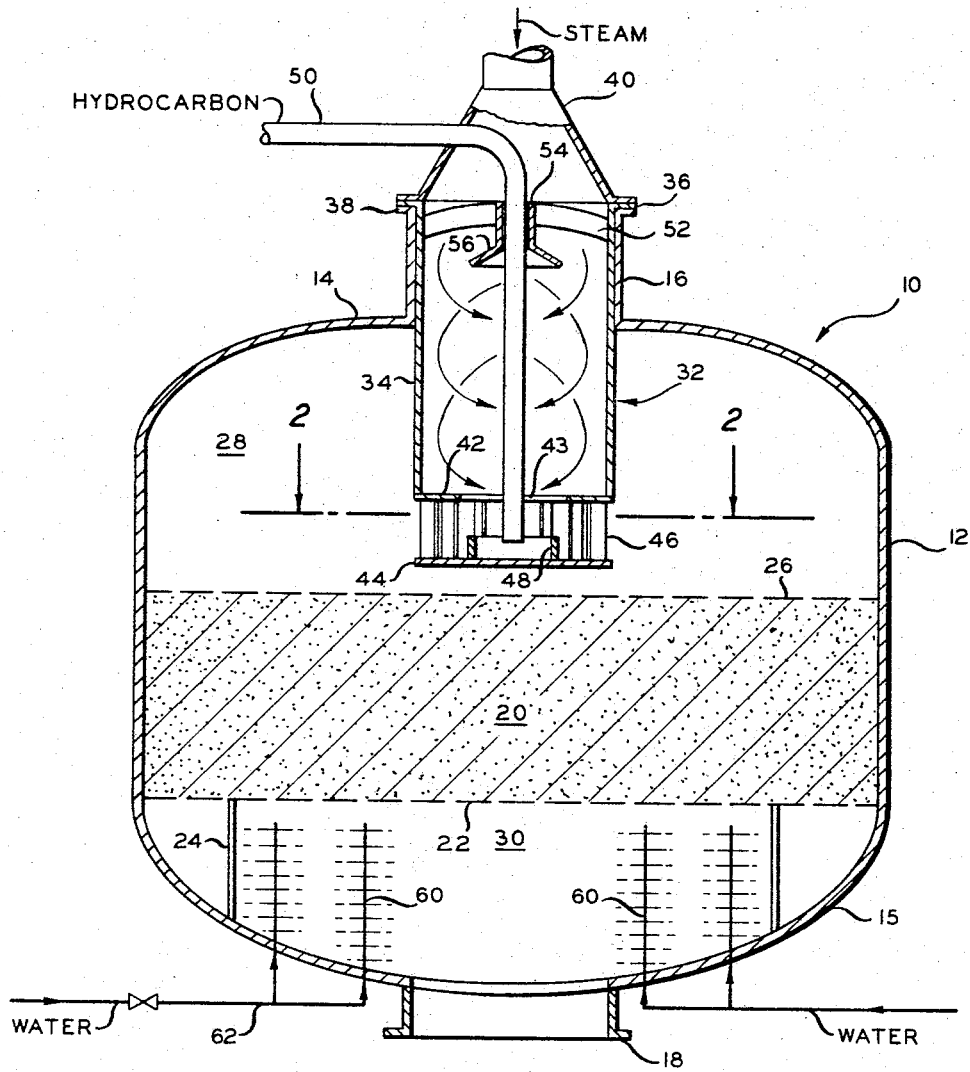

Sept. 5, 1967  R. C. EZZELL  3,340,320
DEHYDROGENATION REACTOR AND PROCESS
Filed June 8, 1964

INVENTOR.
R. C. EZZELL
BY *Young & Quigg*

ATTORNEYS

United States Patent Office 3,340,320
Patented Sept. 5, 1967

3,340,320
DEHYDROGENATION REACTOR AND PROCESS
Robert C. Ezzell, Borger, Tex., assignor to Phillips Petroleum Company, a corporation of Delaware
Filed June 8, 1964, Ser. No. 373,222
6 Claims. (Cl. 260—680)

This invention relates to an improved dehydrogenation reactor and process for the dehydrogenation of dehydrogenatable hydrocarbons in admixture with steam and in contact with a dehydrogenation catalyst.

It is conventional in the petroleum industry to dehydrogenate normally gaseous and light liquid hydrocarbons to less saturated hydrocarbons. Paraffins are dehydrogenated to produce olefins and certain olefins are dehydrogenated to produce diolefins. Butadiene is normally produced by dehydrogenating butylenes from any selected source such as the butylenes obtained from the dehydrogenation of butane.

In a butadiene plant process, the butylene feed was preheated and admixed with superheated steam to provide a selected dehydrogenation temperature and the resulting mixture was passed thru a fixed bed of particulate catalyst to dehydrogenate the butylene to butadiene. The catalyst utilized in this particular operation consisted essentially of 52 percent $K_2CO_3$, about 3 percent $Cr_2O_3$, and about 45 percent $Fe_2O_3$ (percents are by weight). Continuous and automatic sampling followed by computer analysis of the process revealed that undesired conversion of as much as 6 percent of the feed was observed after mixing the steam and hydrocarbon and before the mixture reached the catalyst bed. This study indicated that improvements in the conversion and selectivity of the dehydrogenation reaction were desirable.

Accordingly, an object of this invention is to provide an improved process and apparatus for the dehydrogenation of dehydrogenatable hydrocarbons. Another object of the invention is to provide a process and apparatus which effect more efficient mixing of the steam and hydrocarbon prior to the dehydrogenation step. Another object is to provide a process and apparatus which effect mixing of steam and hydrocarbon to be dehydrogenated just prior to contacting the dehydrogenation catalyst with the mixture. A further object is to provide efficient and immediate quenching of the dehydrogenation effluent from a bed of dehydrogenation catalyst in which a hydrocarbon feed is dehydrogenated in admixture with steam. Other objects of the invention will become apparent to one skilled in the art upon consideration of the accompanying disclosure.

A broad aspect of the invention comprises maintaining a fixed bed of a steam-insensitive dehydrogenation catalyst in an enclosed reaction zone provided with vapor spaces above and below the catalyst bed, injecting superheated steam spirally downwardly thru the central section of the upper vapor zone and radially outwardly into the surrounding vapor zone, injecting a stream of dehydrogenatable hydrocarbon into the steam adjacent the lower end of its downward flow so that it intimately mixes with the steam in radial flow, passing the resulting mixture of steam and hydrocarbon downwardly into the catalyst bed so as to dehydrogenate the hydrocarbon to a less saturated hydrocarbon material, and recovering an effluent stream from the catalyst bed containing dehydrogenated hydrocarbon material. It is preferable to quench the effluent stream in the lower vapor space immediately following the entry of the stream to this zone from the catalyst bed.

In terms of apparatus, a broad aspect of the invention comprises the combination of an upright cylindrical reactor containing a fixed bed of dehydrogenation catalyst extending transversely across an intermediate section of the reactor so as to form an upper vapor chamber and a lower vapor chamber, steam and hydrocarbon mixing and distributing means comprising an axial hydrocarbon feed conduit extending into the upper vapor chamber to a level substantially above the catalyst bed surrounded by an enclosed annular steam passageway with means at the upper end of said passageway for effecting downward spiral flow of the steam and means at the lower end of the hydrocarbon feed conduit for directing the incoming feed upwardly into the downwardly moving steam and means for directing the steam and hydrocarbon radially and spirally outwardly into the surrounding vapor chamber so that the intimate mixture of steam and hydrocarbon then passes downwardly thru the fixed catalyst bed. The reactor is preferably provide with a plurality of quenching sprays in the lower vapor chamber for directing quench fluid, such as water, laterally into the product stream immediately upon its entry into this vapor chamber.

Figure 2:
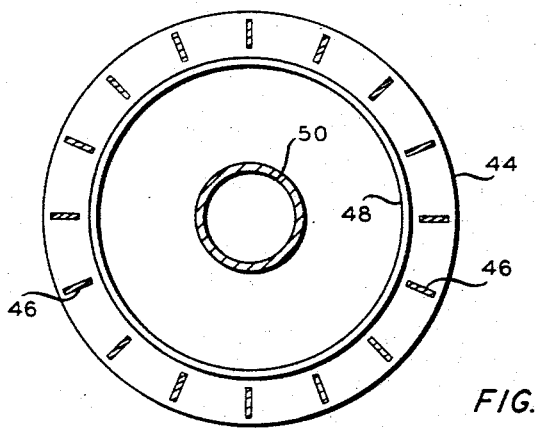

A more complete understanding of the invention may be had by reference to the accompanying schematic drawing of which FIGURE 1 is an elevation in partial section of a preferred embodiment of the reactor and FIGURE 2 is a horizontal cross section of the lower end of the centrifix of FIGURE 1 taken on the line 2—2.

Referring to the drawing, a reactor 10 comprises a cylindrical shell 12 having a top closure 14 and a bottom closure 15. An inlet 16 is provided in top closure 14 and an outlet 18 is provided in the bottom closure 15. A cylindrical fixed catalyst bed 20 occupies an intermediate section of the reactor, being supported by a perforated grid or screen 22 which is supported by legs 24. A perforated grid or screen 26 extends across the upper surface of the catalyst bed. The positioning of the catalyst bed 20 in the reactor forms an upper vapor space 28 and a lower vapor space 30.

A centrifix 32 is positioned in inlet neck 16 and comprises a tube 34 having an upper flange 36 which seals between the flanges 38 of steam inlet line 40. The lower end of tube 34 is partially closed by an annular closure member 42. A bottom cylindrical plate 44 is attached coaxially to annular member 42 by a series of upright vanes 46 extending from adjacent the inner periphery of annular member 42 radially outwardly in a circular pattern which imparts outwardly radial motion to the gases passing therethru. This arrangement of the vanes is illustrated best in FIGURE 2. A ring 48 is welded to or otherwise affixed on plate 44. A hydrocarbon feed conduit 50 extends from outside the centrifix thru steam inlet 40 and concentrically downwardly thru collar 54 and tube 34 to a level within ring 48 and above plate 44 so that ample space is provided for flow of hydrocarbon feed into the lower section of the centrifix.

Means for spiraling the influent steam is provided in the upper end of tube 34 and comprises a series of radially and spirally arranged baffles 52 attached to a collar 54 at their inner ends and to tube 34 at their outer ends. Collar 54 is provided with an outwardly flared end 56 which aids in spiraling the flow of steam thru the centrifix. It is also feasible to weld baffles 52 directly to conduit 50 and eliminate the use of collar 54. However, the construction shown is preferred.

Extending into vapor chamber 30 are two concentric rings of spray lines 60 which connect with a water line 62 or other source of quench fluid. These sprays are arranged so as to direct quench fluid laterally in all directions within vapor chamber 30 so as to quickly quench the reaction effluent from the catalyst bed.

In operation prior to the development of the invention, steam and hydrocarbon were admixed in line 40 upstream of the centrifix 32. After mixing, the mixture passed thru 15′ of 20″ I.D. pipe and the equivalent of approximately 5′ of 30″ I.D. pipe at pressures approximately 10 to 15 p.s.i. above those in the reactor. In accordance with the invention, the steam and hydrocarbon are not mixed until they reach the bottom of centrifix 32 where the steam spirals thru the opening 43 in annular member 42 and flows outwardly into vapor chamber 28. The influent hydrocarbon emerges from conduit 50 and is deflected upwardly by plate 44 and ring 48 into the outwardly swirling steam, thereby being intimately mixed with the steam. Plate 44 is spaced substantially above screen 26 so that the mixture of steam and hydrocarbon from vapor chamber 28 has access to the whole cross section of the catalyst bed. This arrangement greatly reduces the time in which the hydrocarbon and steam are mixed and the hydrocarbon further heated by the steam so as to reduce the undesirable thermoconversion of hydrocarbon material before reaching the catalyst bed 20.

The reactor which was revised in the development of the invention was 16' in diameter having straight sides (cylindrical section) of 4'7". The centrifix had a diameter of 2'6" and a center divider having a dome shaped top and a conical bottom (56) with baffles 52 surrounding same. The steam and hydrocarbon were injected upstream of this centrifix into line 40 and the spiraling flow thru the centrifix provided intimate mixing. The revision of the centrifix comprised cutting a hole about 10½" in diameter downwardly thru the center deverter and putting a 90° L 8" I.D. thru the side of steam inlet 40 with an extension of 8" conduit therefrom coaxially with tube 34 to a level about 2½" above plate 44. Ring 48 was installed coaxially with pipe 50 and plate 44 to impart upward flow to the hydrocarbon stream and direct same into the outwardly swirling steam. Ring 48 was 3½" high and 12" I.D. Opening 43 in annular member 42 was 20" I.D. The length of tube 34 was about 38" and its I.D. was 2'6". Radial vanes 46 were 8" long and 4" wide and arranged radially with their inner edges about 5" outside of ring 48. Sixteen of these vanes were arranged in a uniform pattern so as to straighten out the flow of steam passing spirally thru opening 43. Plate 44 was positioned 4" above the top of screen 26.

The spiraling means at the upper end of centrifix 32 utilizes 8 uniformly spaced, spirally directed vanes or baffles 52. These baffles impart a distinct spiraling flow pattern to the steam descending thru the annulus of tube 34 and passing thru passageway 43. The reactor and its internal parts including centrifix 32 were fabricated of stainless steel.

Runs were made with the arrangement of apparatus before revision in accordance with the invention and after revision of the apparatus in accordance with the invention with and without quenching as provided in vapor chamber 30. In each of the runs, the feed was preheated to a temperature of about 1075° F. When the quench was used the effluent stream from the catalyst bed was quenched to 1000° F. by direct quench with water. The data obtained from the runs are presented in the table below:

out quench, conversion was 0.85 mol percent lower with the new type feed entry with an increase of 0.1 mol percent yield. This is a reduction of 2.45 percent of the feed which was being converted at no loss in yield. With quench, conversion loss was 0.88 mol percent and yield loss was 0.05 mol percent, or a saving of 2.6 percent of the feed and a loss of 0.2 percent yield. It has been calculated that on the basis of present costs, the improved feed introduction and quench result in an annual savings of $87,000 per reactor per year, based upon the operating levels at which the investigation was conducted. It is planned to utilize higher steam temperatures which will effect even greater savings in feed and comparable increased dollar savings. Preliminary data analysis shows an average increase of 0.336 ton/day of butadiene per degree rise in steam temperature over a range of 1250 to 1400° F. Hence, operating at 1400° F. steam temperature will effect an increase of about 6 tons per day of butadiene per reactor. Dollar wise, this amounts to a savings of $62,500 per year per reactor.

Without the improved method and reactor revision which delays the mixing of the high temperature steam with the preheated feed until immediately preceding the flow of the mixture into the catalyst bed, operating at the higher temperatures indicated above would destroy even a greater percentage of the feed than was destroyed at the lower temperatures.

The temperature of the reaction mixture just prior to entering the catalyst bed is maintained in the range of 1230 to 1300 F. The effluent is quenched to a temperature not substantially exceeding 1000° F. Butylene feed preheat temperature ranges from about 1025 to 1100 F. Temperatures of preheat for other feeds vary with the refractoriness of the feed and should avoid destruction of any appreciable amount thereof before reaching the catalyst bed. The process may be operated with steam temperatures as high as 1500° F. and steam to hydrocarbon ratios in the range of about 7 to 1 to 15 to 1 on a mol basis.

Certain modifications of the invention will become apparent to those skilled in the art and the illustrative details disclosed are not to be construed as imposing unnecessary limitations on the invention.

I claim:
1. A process for dehydrogenating a dehydrogenatable stream of hydrocarbon in vapor phase admixed with steam in contact with a steam-insensitive dehydrogenation catalyst which comprises the steps of:
 (1) maintaining a fixed bed of said catalyst in an enclosed reaction zone provided with vapor spaces above and below said bed;
 (2) injecting superheated steam spirally downwardly thru the central section of the vapor zone above said bed and radially outwardly into the surrounding vapor zone;
 (3) injecting a stream of said hydrocarbon into said steam as it flows outwardly from said central sec-

| TABLE | | | | |
| --- | --- | --- | --- | --- |
| | No Quench and Old Feed Entry | No Quench and New Feed Entry | With Quench and Old Feed Entry | With Quench and New Feed Entry |
| Feed Rate, s.c.f.h. | 295,154 | 296,079 | 295,802 | 296,901 |
| Steam Rate, lbs./hr. | 151,870 | 151,232 | 151,832 | 151,874 |
| Superheater Outlet, ° F. | 1,375 | 1,374 | 1,375 | 1,377 |
| Conversion, mol percent | 34.57 | 33.72 | 33.80 | 32.92 |
| Selectivity, mol percent | 65.20 | 66.32 | 67.09 | 68.72 |
| Yield, mol percent | 22.54 | 22.55 | 22.67 | 22.62 |

The above data were obtained from runs on a constant feed blend on the same day and with all other conditions substantially constant except for the physical structure of the apparatus. It should be noted that withtion so that it intimately mixes with the steam in radial flow;
 (4) passing the resulting mixture of steam and hydrocarbon downwardly into said catalyst bed so as to dehydrogenate said hydrocarbon to less saturated hydrocarbon;

(5) quenching the effluent stream containing dehydrogenated hydrocarbon by spraying water into same in the vapor space below said bed; and (6) recovering the quenched hydrocarbon stream.

2. The process of claim 1 wherein said hydrocarbon is a butylene stream preheated to a temperature in the range of 1025 to 1100 F., said steam is heated to a temperature in the range of about 1250 to 1500° F. to provide a temperature in the mixture above the bed in the range of about 1230 to 1300° F., and said effluent is quenched to a temperature not substantially exceeding about 1000° F.

3. A catalytic reactor comprising in combination:
(1) a reactor shell of generally upright cylindrical configuration provided with a cylindrical bed of particulate catalyst occupying the entire cross section of said shell and spaced substantially from the bottom and top of said shell to form an upper vapor chamber and a lower vapor chamber above and below, respectively, said bed;
(2) a centrifix extending into said upper vapor chamber axially of said shell and terminating substantially above the bed of (1), comprising:
 (a) an upright cylindrical tube sealed with said shell at its upper end;
 (b) a transverse annular member across the lower end of the tube of (a) providing an axial outlet for steam;
 (c) a transverse circular plate positioned substantially below the annular member of (b), said plate being substantially the diameter of the tube of (a);
 (d) a series of upright vanes extending from the plate of (c) to the annular member of (b) and radially outwardly intermediate the inner and outer peripheries of said annular member;
 (e) a ring of lesser diameter than the axial outlet of (b), concentric with said plate and extending upwardly therefrom a distance in the range of about ¼ to ½ of the height of said vanes;
 (f) a series of radial baffles disposed in a horizontal plane in an annulus adjacent the upper end of said tube attached to a collar coaxial with said tube, and baffles being arranged in a downwardly spirally pattern;
 (g) a hydrocarbon feed conduit coaxial with said tube of smaller diameter than the ring of (e) extending into said ring but spaced substantially from plate of (c) and passing upwardly thru the collar of (f) to a point outside of said shell;
(3) inlet conduit means for steam leading to the upper end of the centrifix of (2); and
(4) an outlet for product connecting with the lower vapor chamber of (1).

4. The reactor of claim 3 including spray means in the lower chamber of (1) for spraying a quenching fluid into the vapor therein.

5. A catalytic reactor comprising in combination:
(1) an upright generally cylindrical shell having top and bottom closure members;
(2) a fixed substantially cylindrical bed of particulate catalyst coaxial with the shell of (1) and occupying a complete transverse cross section of space within said shell and providing an upper vapor chamber above said bed and a lower vapor chamber below said bed;
(3) a hydrocarbon feed conduit extending axially into the upper vapor space of (2) to a level substantially above said bed;
(4) means providing an enclosed annular steam passageway around the conduit of (3);
(5) means in the upper end of the annular passageway of (4) for spiralling influent steam;
(6) means adjacent the lower end of the feed conduit of (3) for directing steam inwardly toward the feed conduit and then radially outwardly into the surrounding vapor chamber;
(7) means for directing hydrocarbon from the lower end of the feed conduit of (3) upwardly into the outwardly travelling steam; and
(8) outlet means communicating with the lower vapor chamber of (2) for effluent product.

6. The reactor of claim 5 including means in the lower vapor chamber of (2) for injecting a quench fluid into the vapor therein.

References Cited
UNITED STATES PATENTS

| | | | |
|---|---|---|---|
| 2,655,442 | 10/1953 | Mayland | 23—212 |
| 3,007,779 | 11/1961 | Vlachos | 23—288 |

DELBERT E. GANTZ, *Primary Examiner.*

G. E. SCHMITKONS, *Assistant Examiner.*